United States Patent [19]

Glauert

[11] 4,117,401
[45] Sep. 26, 1978

[54] POSITION TRANSDUCER, PARTICULARLY TO DETERMINE THE INSTANTANEOUS ANGULAR POSITION OF A ROTATING SHAFT, ESPECIALLY OF AN INTERNAL COMBUSTION ENGINE

[75] Inventor: Wolfram Glauert, Bamberg, Germany

[73] Assignee: Robert Bosch GmbH, Stuttgart, Germany

[21] Appl. No.: 778,675

[22] Filed: Mar. 17, 1977

[30] Foreign Application Priority Data

May 7, 1976 [DE] Fed. Rep. of Germany ....... 2620134

[51] Int. Cl.² ...................... G01R 33/12; G01R 11/02
[52] U.S. Cl. ................................... 324/208; 310/155; 310/168; 324/174
[58] Field of Search ............... 324/174, 173, 207, 208; 310/152, 155, 168; 340/195

[56] References Cited

U.S. PATENT DOCUMENTS 2,434,547  1/1948  Browne, Jr. ........................ 324/207
3,777,255  12/1973  Young et al. ........................ 324/207
4,005,396  1/1977  Fujiwara et al. .................... 324/207

Primary Examiner—Robert J. Corcoran
Attorney, Agent, or Firm—Flynn & Frishauf

[57] ABSTRACT

To suppress stray noise pulse in inductive pick-ups located in magnetic relation to a rotating body, typically the flywheel of an internal combustion engine, so that the instantaneous shaft position can be accurately determined, to accurately compute an ignition instant, fixed or stationary pick-up transducer is formed with an E-shaped core having outer legs and a central leg, the pick-up coil being wound on the central leg, and the magnetic element, typically a permanent magnet rotating with the shaft of the engine, having a width to match essentially only the width of the central core and passing in a plane transverse to the plane of the core, so that the outer legs of the core will act as shields against stray noise pulses. The core can be constructed as a circular element of a central core within a tubular magnetic structure, the E-shaped configuration being obtained by slotting the outer tubular structure.

9 Claims, 4 Drawing Figures

POSITION TRANSDUCER, PARTICULARLY TO DETERMINE THE INSTANTANEOUS ANGULAR POSITION OF A ROTATING SHAFT, ESPECIALLY OF AN INTERNAL COMBUSTION ENGINE

The present invention relates to a position transducer system, and more particularly to an arrangement to determine the instantaneous angular position of a shaft, especially the crankshaft of an internal combustion engine.

Ignition timing of internal combustion engines has a definite relationship to minimum emission of noxious exhaust components and maximum operating efficiency of the engine. In order to select the optimum ignition instant, it is necessary to determine the angular position of the shaft of the internal combustion engine with respect to upper dead center (UDC) position of a piston, or any similar reference. The instantaneous shaft position can be accurately determined by an electronic transducer. To provide electronic control of ignition with respect to the UDC position of a piston, it is necessary to generate reference signal which accurately represents the piston position with respect to UDC position so that the actual ignition instant can then be computed in dependence on temperature, pressure, speed, exhaust composition, or other operating parameters.

It has previously been proposed to couple a disk to the crankshaft of the internal combustion engine on which a permanent magnet is located, rotating in front of an inductive pick-up coil. The pick-up coil is fixedly secured to the frame or other fixed reference position on the engine mount, for example the vehicle with which the engine is to be used. Trigger pulses are induced in the coil each time a magnet passes by, the trigger pulses then being conducted to an electronic ignition timing computer. In a known form, the pick-up coil is located on a cylindrical core having an end face, so that the end face of the core and the end face of the coil are directed towards the rotating disk carrying the permanent magnet. One or more permanent magnets may be located on the disk, as desired.

The amplitude of the signals induced in the coil is highly dependent on speed. It is, therefore, difficult to process the received signal. It has been customary to connect the received signal to a threshold switch; the threshold level of the threshold switch can be matched to the output signal from the coil with difficulty, however, since noise and stray interference pulses are superimposed on the desired output pulses. These interference pulses are derived from stray flux and can be suppressed, or eliminated from signal processing only by comparatively complex electronic circuitry.

It is an object of the present invention to improve the transducer pick-up so that the position of a movable body, typically the rotating shaft of an internal combustion engine, can be determined without receiving output signals which include stray, noise or interference pulses and which interfere with further signal processing of desired position pulses.

Subject matter of the present invention: Briefly, the stationary pick-up is shaped to have a core in E-form. The central leg of the core has a pick-up coil wound thereon. The magnetic element on the movable body, typically on a disk coupled to the shaft of the engine, is preferably a permanent magnet which has a width which is less than the spacing between the legs of the core so that it faces essentially only the central leg, and hence the coil wound thereon. The magnet is movable in a plane transverse to the plane of the core.

It appears that the outer legs of the core in such an arrangement act as a magnetic shield with respect to the stray flux of the permanent magnet mounted to the movable element. The alignment of the E-shaped core with respect to the movable element should be such that the movable element does not pass by the outer legs of the core which form the shield. If it does, then amplification of voltages induced by stray or leakage flux from the permanent magnet movable element may result in the pick-up coil.

Drawings, illustrating an example:

Figure 3:
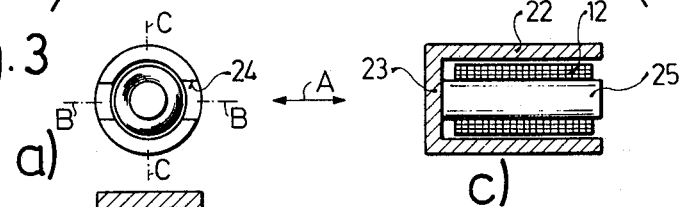
Figure 4:
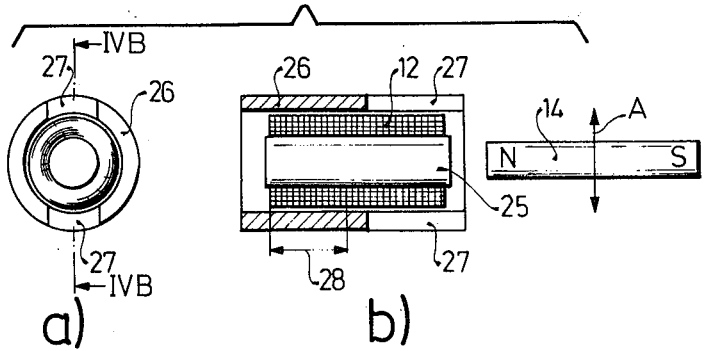

FIG. 3, collectively, shows a modification using a tubular element, in which view $a$ is an end view, view $b$ is a transverse cross section taken along line B—B, and view $c$ is a transverse cross section taken along C—C; and FIG. 4, collectively, illustrates another modification, in which view $a$ is an end view of the transducer, and view $b$ is a cross section taken along line IVB—IVB and additionally illustrating the movable magnetic element.

Figure 1:
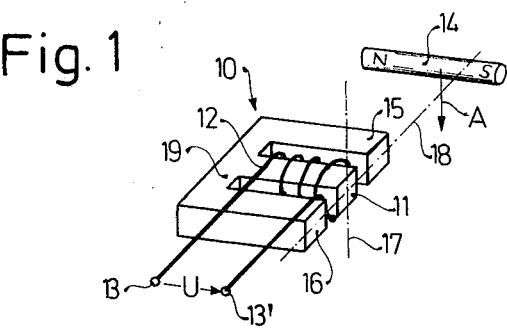
FIG. 1 is a schematic illustration of an E-shaped core, a pick-up coil and the associated magnetic element.

An E-shaped core 10 (FIG. 1) has a central leg 11 on which pick-up coil 12 is wound. Pick-up coil 12 has output terminals 13, 13'. Upon moving a permanent magnet 14 in the direction of the arrow A, an output voltage U will be induced in coil 12, available at terminals 13, 13'. The permanent magnet 14 is passed only opposite the central leg 11 of the E-shaped core 10. The plane of movement of the permanent magnet 14, the magnetic poles of which are indicated in the drawing, follows the chain-dotted line 17, that is, is perpendicular to the plane of the core, the center line of which is shown schematically by chain-dotted line 18. Line 18, therefore, is a schematic representation of one line falling within the plane of the core legs 11, 15, 16 of core 10.

The two outer legs 15, 16 together with the connecting yoke 19 of the E core 10 form a shield for the pick-up coil 12 with respect to the stray or leakage field of the permanent magnet 14 which, in the illustration given, is the magnetically active element in the pick-up system. It is particularly important that the permanent magnet 14 does not pass by the core portions 15, 16, forming the outer legs of the E core 10, and acting as a shield. If magnet 14 does pass by the outer core portions, the voltage induced in pick-up coil 12 due to stray or leakage flux would even be amplified.

Figure 2:
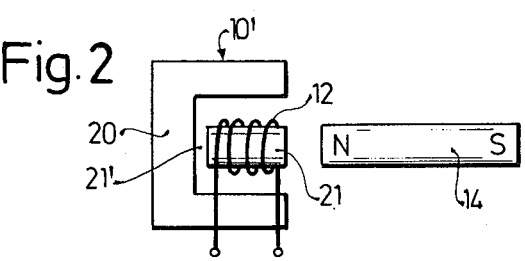
FIG. 2 is a top view of an actual construction with an air gap.

FIG. 2 illustrates the E core 10' which is a composite of a U-shaped element 20 and a central I-shaped core 21. The I core or leg 21 is separated by an air gap 21' from the U core 20 which also provides the outer legs of the structure. Permanent magnet 14 is again passed by the central I core or leg portion 21, moving in a plane perpendicular to the plane of the sheet of the drawing. Thus, the U core 20 forms a magnetic shield for stray or leakage flux. The I core 21 can be secured to the U core 20 as illustrated in FIG. 1, to again form an essentially E structure in which, however, the central leg 21 is foreshortened. Thus, if the I core 21 is secured to the core 20, the end face thereof will be recessed with respect to the end faces of the legs of the U core 20 to increase the axial dimension of the air gap with respect to magnet 14. The arrangement in which an air gap is provided at position 21' or, by an increased dimension between the end face of core 21 and magnet 14, has the advantage that variations in air gap width, due to mechanical inaccuracies, for example, between the central leg 21 and magnet 14, have a lesser effect on the output signal from coil 12. Additionally, the outer legs of the U core portion 20 provide for better shielding.

FIG. 3, collectively, shows an example in which the two outer legs of the E core are formed by a slotted tube 22 having a bottom wall 23. The slots 24, FIGS. 3 — views a, b — may have different depth, depending on the geometry of the arrangement. In the example shown, they are about half the length of the tube 22. The width of the slots 24 is so dimensioned that the permanent magnet 14, upon passing the central leg 25 on which coil 12 is wound, never faces portions of the tube 22. The magnet 14 moves in the direction of the arrow A (FIGS. 1, 3) and is of lesser width than the overall width of the slots 24. The core 25 in the interior of the tube 22, 23 can be separated from the bottom 23 by a non-magnetic gap, for example by an air gap, or it may be foreshortened at the outer end, as described in connection with FIG. 2. A structure as illustrated in FIG. 3 is particularly simple to manufacture.

FIG. 4, collectively, illustrates an example in which the outer legs of the E core are formed by a slotted tube 26. The slots 27 in the tube, again, may have different depths, the yoke of the E core being formed essentially by the unslotted portion of the tube 26. The slits will have a width at least as wide as that of the permanent magnet 14 so that, at no position of permanent magnet 14, portions of tube 26 will be directly opposite magnet 14. The embodiment of FIG. 4 is particularly simple to construct and provides excellent independence of the output signal with respect to variations in air gap, while providing for excellent shielding of coil 12 by the tube 26. The end portion of the central core 25 is recessed with respect to the end faces of the tube 26, as seen in FIG. 4, view b.

The shielding effect can be improved in all the examples shown by matching the shape of the pick-up coil 12 to the shielding portions of the E core. The pick-up coil 12 preferably should be wound on the central leg recessed from the end of the core portion, as seen in FIGS. 3 and 4. In a preferred form, the pick-up coil 12 may encompass only the region indicated by dimension 28, FIG. 4, view b. This provides for excellent isolation of the output signal with respect to stray flux pulses.

The arrangement provides for output pulses which unambiguously correspond to movement of the magnet 14 past the fixed transducer core. Interference, stray or noise signals which previously were picked up by coil 12 can be effectively and largely suppressed so that subsequent filtering and noise suppression circuits to unambiguously determine the output signal when core 14 passes the pick-up coil can be reliably obtained, even though the speed of passage of the pick-up coil 14 with respect to the stationary or fixed coil 12 varies widely.

Various changes and modifications may be made and features described in connection with any one of the embodiments may be used with any one of the others within the scope of the inventive concept.

I claim:

1. Position transducer, particularly to determine the instantaneous angular position of a rotating shaft, comprising
    a magnetic element (14) rotating with the shaft and
    a fixed pick-up transducer (10) including
        a pick-up coil (12) in fixed location with respect to the shaft and in magnetic flux relation with respect to the rotating element (14),
    wherein,
    the fixed pick-up transducer comprises an E-shaped core having outer legs (15, 16) and a central leg (11, 21, 25), the pick-up coil (12) being located on the central leg (11, 21, 25);
    and wherein the magnetic element (14) is movable in the plane transverse to the plane of the E-shaped core and has a width less than the spacing between the inner edges of the outer legs (15, 16) to face essentially only the central leg (11, 21, 25) of the core.

2. Transducer according to claim 1, wherein the central leg (11, 21, 25) is foreshortened with respect to the outer legs (15, 16; 20, 22, 26).

3. Transducer according to claim 1, further including an air gap (21') separating the central leg (11, 21, 25) from the yoke of the E core.

4. Transducer according to claim 1, wherein the outer legs (22, 26) of the core form a cup-shaped tube closed at the end (23), the tube being at least partially axially slotted.

5. Transducer according to claim 1, wherein the outer legs (26) of the core form a partially slotted tube open at the end, the magnetic circuit of the E core between the central portion (25) of the core on which the coil (12) is wound and the outer tube being separated by an air gap.

6. Transducer according to claim 1, wherein the shape of the coil (12, 21, 25) wound on the central leg (11, 21, 25) is matched to the shape of the outer legs (15, 16; 22, 26).

7. Transducer according to claim 1, wherein the coil (12) is wound over only a portion of the length of the central core (11, 21, 25) positioned adjacent the portion of the central core located adjacent the magnetic path of the central leg to the outer legs of the core.

8. Transducer according to claim 1, wherein the core comprises a tubular structure (22, 23, 26) formed with axial slots (24, 27) and a central pin or rod-shaped leg (25) extending axially within the tubular structure;
    an air gap interposed between the central leg (25) and said tubular structure (22, 26);
    and wherein the magnetic element (14) has a width which is less than the width of said slots (24, 27).

9. Transducer according to claim 8, wherein said slots extend partially along the length of said tubular structure;
    and said coil (12) is wound on the central leg (25) in a region (28) beyond the terminal ends of the slots and where the tubular structure (22, 26) is solid and unslotted.

* * * * *